No. 625,798. Patented May 30, 1899.
O. O. OZIAS.
COMPUTING SCALE.
(Application filed July 19, 1897.)

(No Model.) 4 Sheets—Sheet 1.

Witnesses:
J. M. Fowler Jr.
Aly Stewart

Inventor:
Orange O. Ozias
by Church & Church
his Attorneys.

No. 625,798. Patented May 30, 1899.
O. O. OZIAS.
COMPUTING SCALE.
(Application filed July 19, 1897.)
(No Model.) 4 Sheets—Sheet 2.

Witnesses:

Inventor:
Orange O. Ozias,
by Church & Church
his Attorneys

No. 625,798. Patented May 30, 1899.
O. O. OZIAS.
COMPUTING SCALE.
(Application filed July 19, 1897.)

(No Model.) 4 Sheets—Sheet 3.

Witnesses:
J. M. Fader Jr.
Aly F. Stewart

Inventor:
Orange O. Ozias
by Church & Church,
his Attorneys.

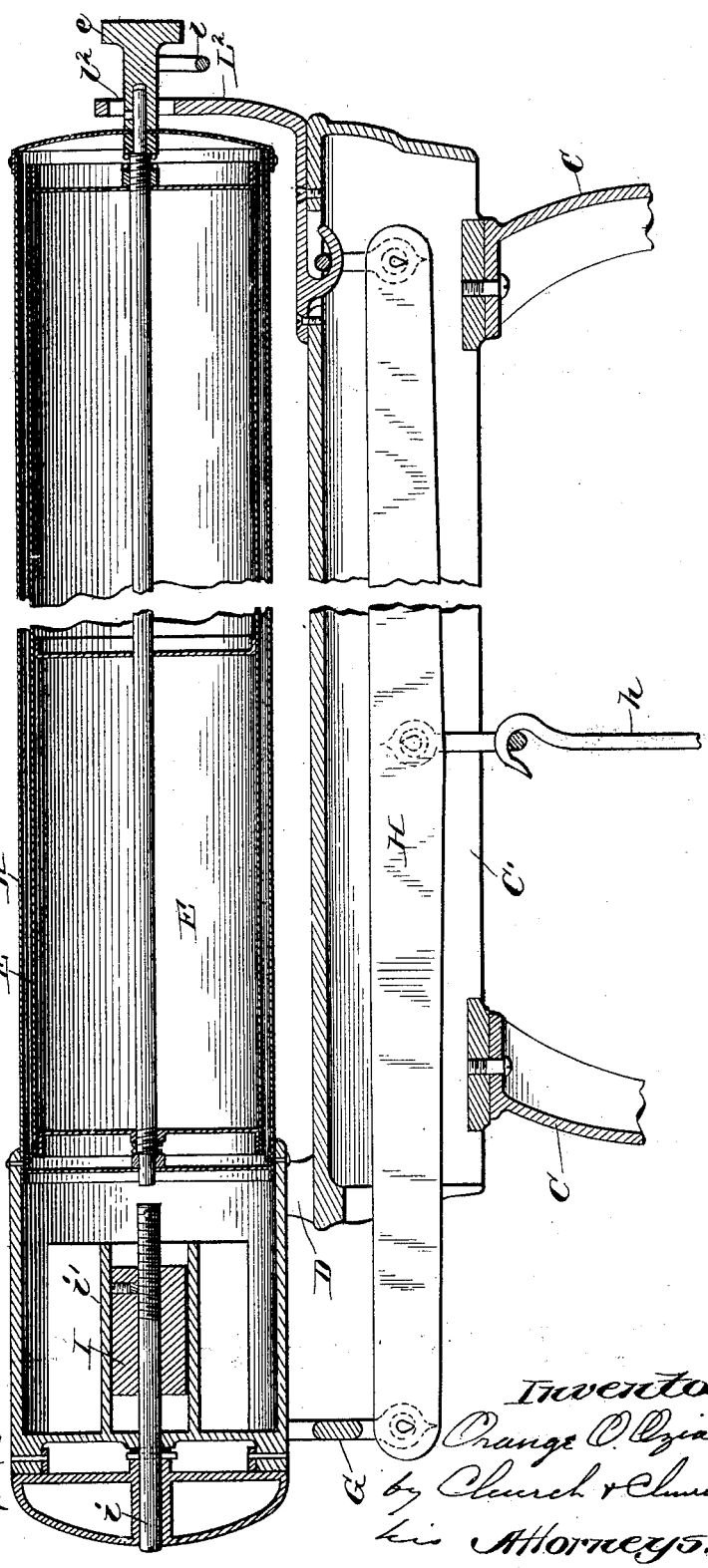

UNITED STATES PATENT OFFICE.

ORANGE O. OZIAS, OF DAYTON, OHIO.

COMPUTING-SCALE.

SPECIFICATION forming part of Letters Patent No. 625,798, dated May 30, 1899.

Application filed July 19, 1897. Serial No. 645,099. (No model.)

*To all whom it may concern:*

Be it known that I, ORANGE O. OZIAS, of Dayton, in the county of Montgomery and State of Ohio, have invented certain new and useful Improvements in Computing-Scales; and I do hereby declare the following to be a full, clear, and exact description of the same, reference being had to the accompanying drawings, forming a part of this specification, and to the letters of reference marked thereon.

This invention relates to improvements in computing-scales of that class wherein a computing member is employed bearing a series of sets of computations of value at different rates per unit; and the invention has for its object to provide a convenient, compact, and highly-efficient arrangement of parts whereby there is little or no danger of the parts getting out of adjustment by reason of rough handling or wear.

A further object is to bring the parts into such position and relation to each other that the use of the scale will be greatly simplified and danger of miscalculation on the part of the user reduced to a minimum.

Figure 1:
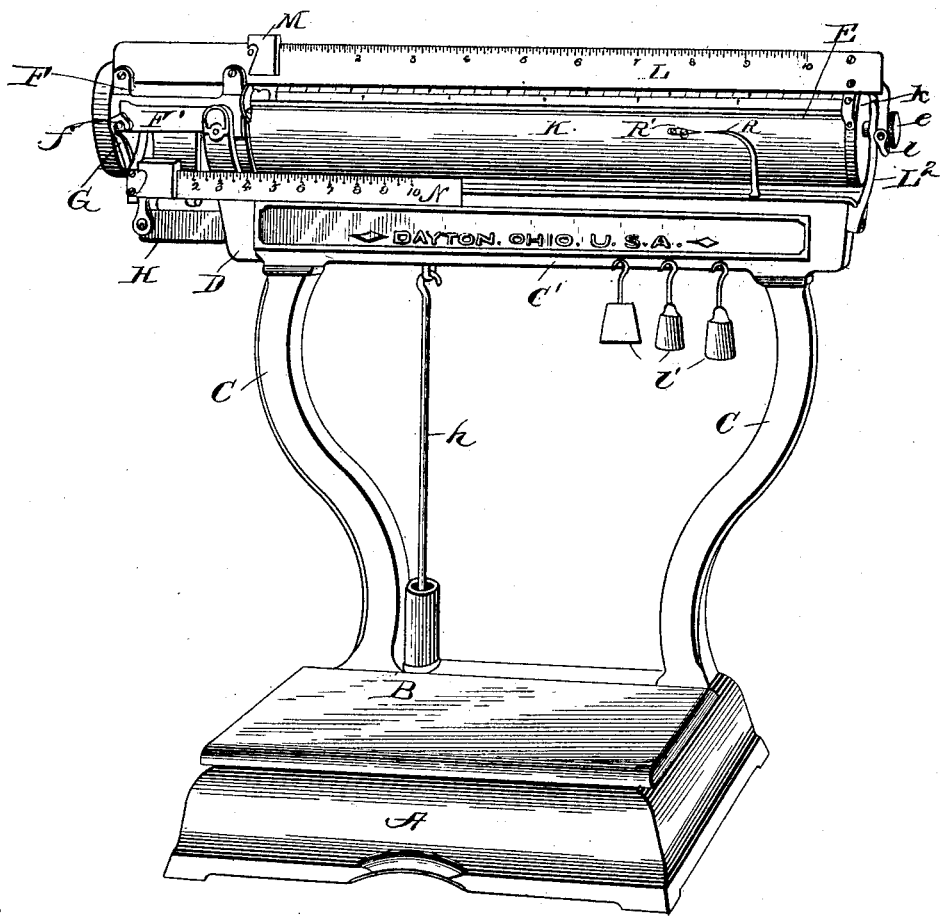
Figure 2:
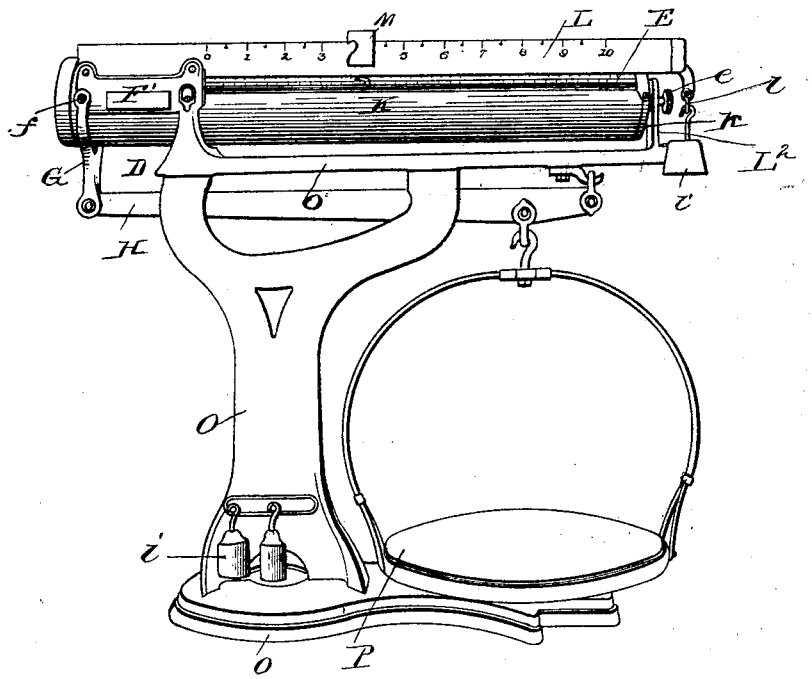
Figure 3:
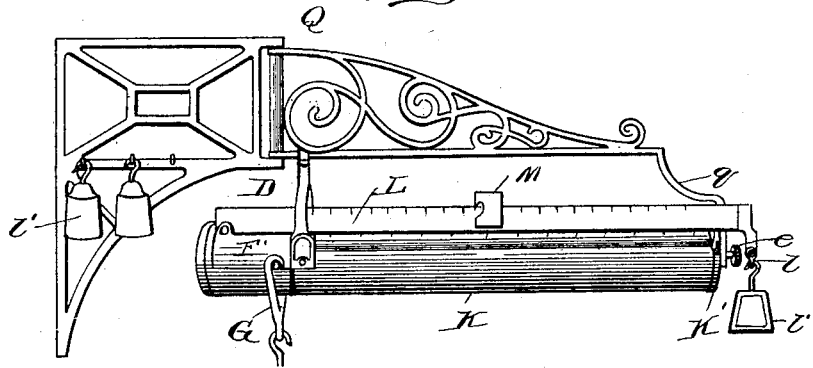
Figure 3:
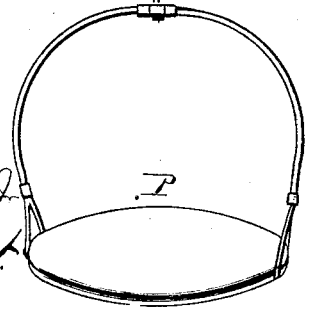
Figure 4:
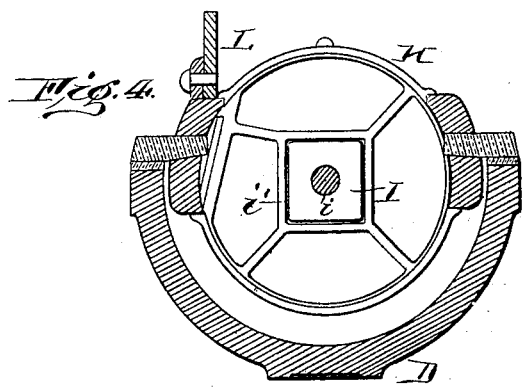
Figure 5:
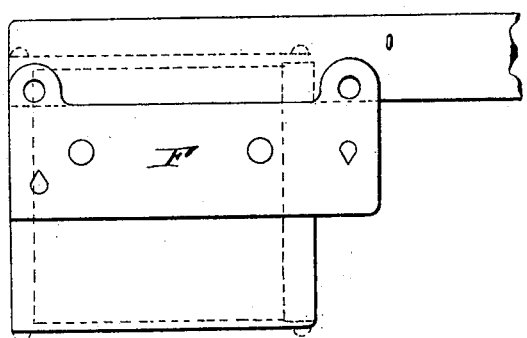
Figure 6:
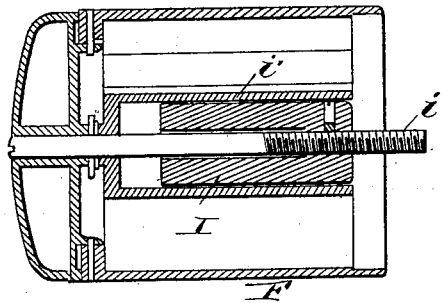
Figure 7:
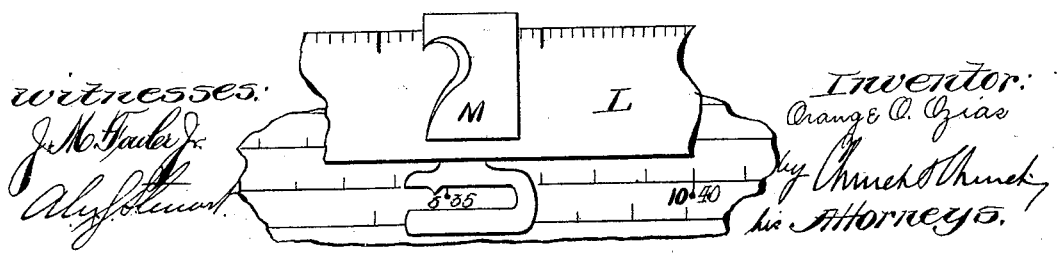

Referring to the accompanying drawings, Figure 1 is a perspective view of one of the preferred embodiments of my invention in the form of a lever-and-beam scale or counter-scale. Fig. 2 is a similar view of the structure embodied in what is known as a "butcher's counter-scale." Fig. 3 is a similar view showing the invention embodied in a butcher's hanging scale. Fig. 4 is a detail section, taken vertically through the supporting-yoke and non-rotary prolongation, of the computing member shown in the former views. Fig. 5 is a detail side elevation, partially broken away, of the structure shown in Fig. 4. Fig. 6 is a vertical section taken at right angles to Fig. 4. Fig. 7 is a detail of the sliding poise. Fig. 8 is a longitudinal section through the beam and frame, Fig. 1.

Like letters of reference in the several figures indicate the same parts.

In said drawings, Fig. 1, the letter A indicates the base or platform of any usual or preferred construction, adapted to contain within it the ordinary platform-levers and to support the goods-receiver B, as usual. From the base A supporting-arms C extend upwardly and carry at their top a subbase C', the form of these arms being preferably such as to give the ogee-curve appearance. At one end of the subbase I mount or form an upwardly-extending yoke D, which constitutes the pivotal bearings for the beam, the arms of said yoke being branched widely apart, as shown clearly in Fig. 4, to permit the computing member of the beam to fit in between them, thereby insuring a proper gravity balance of the entire beam.

In the preferred construction the beam itself is composed, primarily, of a computing member in the form of a cylinder E, which may be rotated by means of a knob $e$ at one end and having at the opposite end a non-rotary prolongation F, to which the pivots for supporting the beam and for the attachment of the load-supporting devices are connected. As shown, the pivots $f$ are mounted in side pieces or castings F', which are adapted to be secured to the non-rotary prolongation of the computing member in order to facilitate manufacture and adjustment, as will be readily understood. The connection with the goods-supporting mechanism or platform-levers is made in the present instance by means of a yoke G, partially surrounding the end of the computing member and suspended upon the pivots $f$, the lower portion of said yoke being pivotally connected to an intermediate lever H, pivoted beneath the subbase and connected to the platform-levers by a link $h$ in the ordinary well-known manner.

The non-rotary prolongation of the computing member is preferably hollow or chambered within for the accommodation of a balance-weight I, Figs. 4, 6, and 8, which weight may be moved longitudinally by any well-known mechanism—such, for instance, as a screw $i$—and held against rotation with said screw by means of guides $i'$, for instance, in the non-rotary prolongation.

For convenience in reading the value indications on the computing member it is preferably inclosed by a casing K, attached to the non-rotary prolongation at one end and supported, if necessary, at the opposite end by a head $k$, which head is in turn connected with a graduated beam L, extending substantially parallel with the computing member and rigidly attached at its opposite end to the prolongation F.

The vertical movements of the free end of the beam may be limited by a slot $l^2$ in an ordinary standard $L^2$, and it may further be provided with a loop $l$ for the attachment of removable counterpoise-weights $l'$ for weighing substances heavier than the capacity of the beam proper.

The poise M preferably slides on the graduated bar L and is adapted to register with the graduations thereon to indicate pounds and ounces, and it is provided with an indicator or pointer extending down and adapted to register with the graduations or indications of value on the computing member.

In the preferred construction the poise is adapted to conceal the graduations, except those immediately on each side of the point of registry, for which purpose (see Fig. 7) it is preferably provided with a slot or aperture substantially corresponding in width to the vertical height of each set of graduations and of a length permitting two or three of the major graduations of each set to be exposed, and thus the danger of reading the wrong graduation is practically overcome. This device is especially useful where double sets of graduations are used on the computing member in connection with removable counterpoise-weights and the construction and shape of the side opening are such as to permit of one of each of the sets of graduations to be exposed, as already indicated.

It will be observed that the pivots $f$, in which the beam turns and to which the goods-receiving mechanism is attached, are located on each side of a vertical plane coincident with the axis of the computing member, and these pivots, together with the pivots for the loop $l$, are located in a horizontal plane intersecting the body of the computing member, whereby the gravity of the whole beam and its balance may be easily and accurately adjusted to secure the desired sensitiveness and accuracy in weighing light articles.

Where it is desired, a tare-beam may be attached to the non-rotary prolongation of the computing member, as shown at N in Fig. 1, and a poise may be mounted thereon for indicating pounds and ounces in the well-known manner, although it is preferred that this tare-beam should extend across the center of oscillation of the beam proper, whereby with a much shorter beam a wider range of weight may be balanced with a relatively light poise, inasmuch as the weight in such instance is computed at double its actual value in weight, because it is taken from one side of the center and transferred to the opposite side.

In Fig. 2 the platform and platform-levers have been entirely omitted, and a vertical standard O, provided with a foot $o$, supports the subbase O' and lever H. The goods-receiver, in this instance a hanging platter P, is suspended directly from the lever H over a lateral extension of the base O' to prevent tipping, and the lever H preferably passes through openings or between the bifurcated arms of the standard O, the other portions of the scale corresponding exactly to those previously described, save that in this instance the tare-beam is omitted.

In Fig. 3 the yoke for supporting the beam extends over the top of the beam instead of beneath it, as in the former instance, and is connected to a suspending bracket or support Q, which bracket Q is also provided with an extension $q$ for limiting the swing of the beam in the same manner that the standard $L^2$ limits the swing of the beam in the adaptations of the invention formerly described. The swinging platter instead of being connected to the beam through an intermediate lever may be directly suspended from the beam, as illustrated in this view, Fig. 3, in which instance, however, the pivots in which the beam is suspended should be nearer to the pivots for supporting the goods-receiver, as is well understood by those skilled in the art of scale-making. In other respects the scale corresponds in all particulars to the form previously described, and therefore needs no specific description.

Obviously the particular manner of mounting the pivots upon the non-rotary prolongation of the computing member is immaterial and may be varied to suit the convenience of the manufacturer, or, if desired, the casing surrounding the computing member may be omitted and the computing member itself may be of other shapes than cylindrical in cross-section, although the construction described is preferred.

Where the scales are intended to turn by a very light weight, it is desirable that a pointer or indicator should be provided, and for conveniently accomplishing this end I preferably provide on the base or support a fixed arm R, having its end turned down into a horizontal position in front of the beam near its free end, and provide on said beam a coöperating pointer R', adapted to lie in the same horizontal plane when the beam is in balance, but to move up or down with reference to the fixed pointer when the beam is thrown out of balance in either direction.

Having thus described my invention, what I claim as new is—

1. In a price-scale, a cylindrical non-rotary beam end, side pieces rigidly secured to said end, pivots on said side pieces arranged in pairs opposite each other and at opposite ends of the side pieces, for supporting the beam and for the attachment of the load-support, of a rotary cylindrical extension supported by and in line with the non-rotary end and bearing tables of computations, and a graduated bar rigidly attached at one end to one of said side pieces and projecting parallel with and in proximity to said rotary cylindrical extension; substantially as described.

2. In a price-scale, a cylindrical non-rotary beam end, side pieces rigidly secured to said end, pivots for supporting the beam and for the attachment of the load-support carried by said side pieces, of a rotary cylindrical extension supported by and in line with the non-rotary end, a casing surrounding said rotary extension, rigidly attached at one end to one end of the non-rotary member, and a graduated bar rigidly attached at one end to one of the side pieces and at the opposite end to the outer end of the casing; substantially as described.

ORANGE O. OZIAS.

Witnesses:
 ISAAC G. KENNEDY,
 C. W. JAMES.